US007140043B2

(12) United States Patent
Choi et al.

(10) Patent No.: US 7,140,043 B2
(45) Date of Patent: Nov. 21, 2006

(54) WATERMARK EMBEDDING AND DETECTING METHOD BY QUANTIZATION OF A CHARACTERISTIC VALUE OF A SIGNAL

(75) Inventors: Jong-Uk Choi, Seoul (KR); Won-Ha Lee, Seoul (KR); Seung-Won Shin, Seoul (KR)

(73) Assignees: Marktec Inc., Seoul (KR); Markany Inc., Seoul (KR)

( * ) Notice: Subject to any disclaimer, the term of this patent is extended or adjusted under 35 U.S.C. 154(b) by 370 days.

(21) Appl. No.: 10/821,550

(22) Filed: Apr. 8, 2004

(65) Prior Publication Data

US 2005/0002526 A1 Jan. 6, 2005

(30) Foreign Application Priority Data

Apr. 8, 2003 (KR) ...................... 10-2003-0021827

(51) Int. Cl.
*H04L 9/00* (2006.01)
*G06K 9/36* (2006.01)
*G06K 9/38* (2006.01)

(52) U.S. Cl. ............................ 726/26; 726/32; 380/54; 380/201; 382/52

(58) Field of Classification Search .................. 380/54, 380/201; 726/26, 18, 19, 17, 34, 35, 32, 726/30; 382/52, 100
See application file for complete search history.

(56) References Cited

U.S. PATENT DOCUMENTS

| | | | | |
|---|---|---|---|---|
| 6,996,273 | B1 * | 2/2006 | Mihcak et al. | 382/181 |
| 7,020,775 | B1 * | 3/2006 | Mihcak et al. | 713/176 |
| 7,028,189 | B1 * | 4/2006 | Mihcak et al. | 713/176 |
| 2004/0001637 | A1 * | 1/2004 | Mitchell et al. | 382/239 |
| 2004/0005097 | A1 * | 1/2004 | Venkatesan et al. | 382/252 |

* cited by examiner

*Primary Examiner*—Norman M. Wright
(74) *Attorney, Agent, or Firm*—Blakely, Sokoloff, Taylor & Zafman; Stephen M. De Klerk

(57) ABSTRACT

A method for embedding and detecting watermark by a quantization of a characteristic value of a signal is disclosed. In order to embed watermark, first, a signal which will be watermarked is segmented in a predetermined time period, and a characteristic value with regard to a signal within the frame obtained therefrom is evaluated in a predetermined manner. Quantized values within a set corresponding to a value of pattern information embedded into the frame among a plurality of sets including one or more quantized value respectively is compared with each characteristic value so as to determine a quantized value closest to the characteristic value. The intensity of insertion used for modifying the signal within the frame in order to make the characteristic value same as the determined quantized value is evaluated, and the signal within the frame is modified based on the evaluated intensity of insertion. The watermark detection is performed in a similar process as the embedment. Accordingly, a method for embedding and detecting watermark which is especially suitable for authentication of audio signals is provided.

17 Claims, 5 Drawing Sheets

WATERMARK EMBEDDING AND DETECTING METHOD BY QUANTIZATION OF A CHARACTERISTIC VALUE OF A SIGNAL

CROSS-REFERENCE TO RELATED APPLICATIONS

The present patent application claims priority from Korean Patent Application No. 2003-0021827, filed on Apr. 8, 2003.

BACKGROUND OF THE INVENTION

1. Field of the Invention

The present invention relates to watermarking method and device, and more particularly a watermarking method which is capable of integrity authentication by identifying forgery/alternation of digital audio signals, and device thereof.

2. Description of the Related Art

Watermarking technology is used in various fields such as broadcasting monitoring, owner identification, authentication, fingerprinting for tracing illegal circulation, covert communication, copy control, etc. The requirements for watermarking technology used in these applied fields may differ for each field; however, in common, the difference between the original data and the watermarked data should not be identified by the human five senses.

Among these various applied fields, authentication is one of the applied fields which are recently gaining attention. Systematic research on authentication has been performed for a long period of time in the field of encryption. The first person to bring up the problem of authentication in the field of watermarking was Friedman (U.S. Pat. No. 5,499,294). He proposed that authentication for digital images will be possible by embedding an encrypted signature extracted as the characteristic value of an image into an image data. In such case, even if a single pixel of information is changed, it is impossible to detect the signature which corresponds to the embedded encrypted signature. Thus, no manipulation is allowed. In addition, Lin & Chang proposed an authentication method wherein the embedded data are not changed by harmless data manipulation such as JPEG compression, whereas the embedded data are changed by other attacks such as the addition, deletion or alternation, etc. of a part of the data.

Among the various applied fields of watermark, the present invention focuses on research on authentication. Research on the previously developed authentication technology was mainly directed to image and video, and there was almost no authentication technology related to voice signal and audio signal. Recently, as a voice recording device is changing from an analogue recording device into a digital recording device, authentication on audio signals is being required. Thus, along with the development of digital voice recording devices using voice recorders and MP3 players, the necessity of authentication is increasing.

SUMMARY OF THE INVENTION

Technology for identifying forgery/alternation of audio signals should provide a function which can sense whether the original content has been manipulated when a part of any data in the recorded audio signal data has been changed, or when any data is added to the audio signal data, or when a part of the audio signal data is deleted. Further, it also should provide information for understanding its original meaning by inferring the location of the forgery/alternation, and the form of manipulation.

The technical characteristics required to attain the above object includes, inaudibility of the watermarking data embedded, robustness against compression, tamper resistance for preventing the exposure of watermarking technology, and reliability capable of embedding and extracting various patterns, etc. Further, on the premise that it should be inserted as a module into ordinary household appliances, quick processing is required so that real-time processing for realizing hardware is possible and a limited amount of memory is to be used.

An object of the present invention is to provide a method for watermarking data which can satisfy the above content, and device thereof, and more particularly to provide a method for watermarking appropriate for preventing and detecting forgery/alternation of audio signals, and device thereof.

In order to attain the above object, the method for watermarking in accordance with the present invention comprises steps of evaluating a characteristic value, determining a quantized value, evaluating an intensity of insertion, and modifying the signal.

In the step of evaluating a characteristic value, a characteristic value for a signal within a frame obtained by segmenting the signal to be watermarked in a predetermined time period is evaluated in a predetermined manner.

In the step of determining a quantized value, a quantized value most closely approximated to the characteristic value is determined by comparing the characteristic value with the quantized value within a set among a plurality of sets including one or more quantized value respectively, the set corresponding to a value of pattern information embedded into the frame.

In the step of evaluating an intensity of insertion, an intensity of insertion used in order to modify the signal within the frame so that the characteristic value is the same as the quantized value is evaluated.

In the step of modifying the signal, the signal is modified within the frame based on the intensity of insertion.

At this time, the method may further comprise a step of filtering the signal through a predetermined range of frequency before the step of evaluating a characteristic value, wherein the characteristic value for the filtered signal is evaluated.

Also, the method may further comprise a step of detecting a silent part within the signal, wherein the step of evaluating the characteristic value to the step of modifying the signal may performed only for a frame including the signal excepting the silent part.

It is preferable for the pattern information embedded as a watermark to include an error detecting code or an error correcting code, and a synchronizing signal.

The pattern information may consist of one bit for each frame, or a plurality of bits for each frame. The method for inserting a plurality of bits into each frame may comprise a step of filtering the signal through a plurality of ranges of frequency with a respectively different range of band before the step of evaluating the characteristic value, wherein the plurality of bits is inserted respectively into each of signals filtered through the plurality of ranges of frequency.

The method for detecting a watermark in accordance with the present invention comprises steps of evaluating a characteristic value, determining a quantized value, and extracting a pattern information.

In the step of evaluating a characteristic value, a characteristic value for the signal within a frame obtained by segmenting the signal in a predetermined time period is evaluated in accordance with the same manner as in the step of evaluating the characteristic value in embedding the watermark.

In the step of determining a quantized value, a quantized value most closely approximated to the characteristic value is determined by comparing the characteristic value with each quantized value within a plurality of sets of the quantized values used for a quantization of the characteristic value in embedding the watermark.

In the step of extracting pattern information, a value corresponding to the set of quantized values involving the quantized value determined in the determining step is extracted as a pattern information inserted into the frame.

If the signal has been filtered when the watermark is being embedded, it is preferable for the signal to be filtered when extracted. At this time, if the signal is filtered through a plurality of ranges of frequency when the watermark is embedded so that a plurality of bits are respectively embedded as a pattern information into each range of frequency, it should also be filtered through a plurality of ranges of frequency when extracted so that a pattern information is extracted from each range of frequency.

In accordance with the present invention, more particularly a method for embedding and detecting watermark appropriate and reliable for authenticating audio signal by quantizing the characteristic value of the signal is provided.

The present invention proposes an audio watermarking technology which uses the quantization of audio characteristic value. In accordance with the experimental results, it can be verified that the technology proposed in the present invention is very robust against various lossy compression, and that an original song and a watermarked one were almost indistinguishable. In accordance with the technology proposed in the present invention, the detecting rate for audio signals which have gone through the regular compression is higher than 88%, and the detection rate for all other attacks except pitch shift is higher than 80%. SNR which was presented as the standard for evaluating the quality of sound is about 49~64 dB, and thus maintains a level almost the same as that of the original sound. This shows that even experts could not easily distinguish the original song from the watermarked song.

In accordance with the present invention, reliability is given to the voice data stored in a digital format. Data stored as hardware products in a digital format such as digital cameras or digital voice recorders, can be manipulated and altered, and thus do not have legal force, and cannot be used as any kind of evidence material. If the present invention is realized in a hardware to operate in ordinary household appliances, the presence of forgery/alternation of the audio signal stored in a digital format can be sensed. Therefore, the integrity authentication of content for digital data which were not reliable due to the fact that the data could be easily manipulated became possible. In particular, recently, as appliances such as MP3 players, telephone counseling service, voice recorders, etc. are widely being used, the amount of data stored in a digital format is increasing in geometric progression, and thus the present invention will be widely applied.

DETAILED DESCRIPTION OF THE INVENTION

Preferable embodiments of the present invention will be described in detail with reference to the drawings in the following.

The present invention proposes a technology for an integrity authentication of content for voice signals based on the watermarking technology using the group quantization of the audio characteristic value. The embedment and extraction of a watermark in accordance with the present invention are performed by the watermarking device having a basic configuration as shown in FIG. 1.

Figure 1:
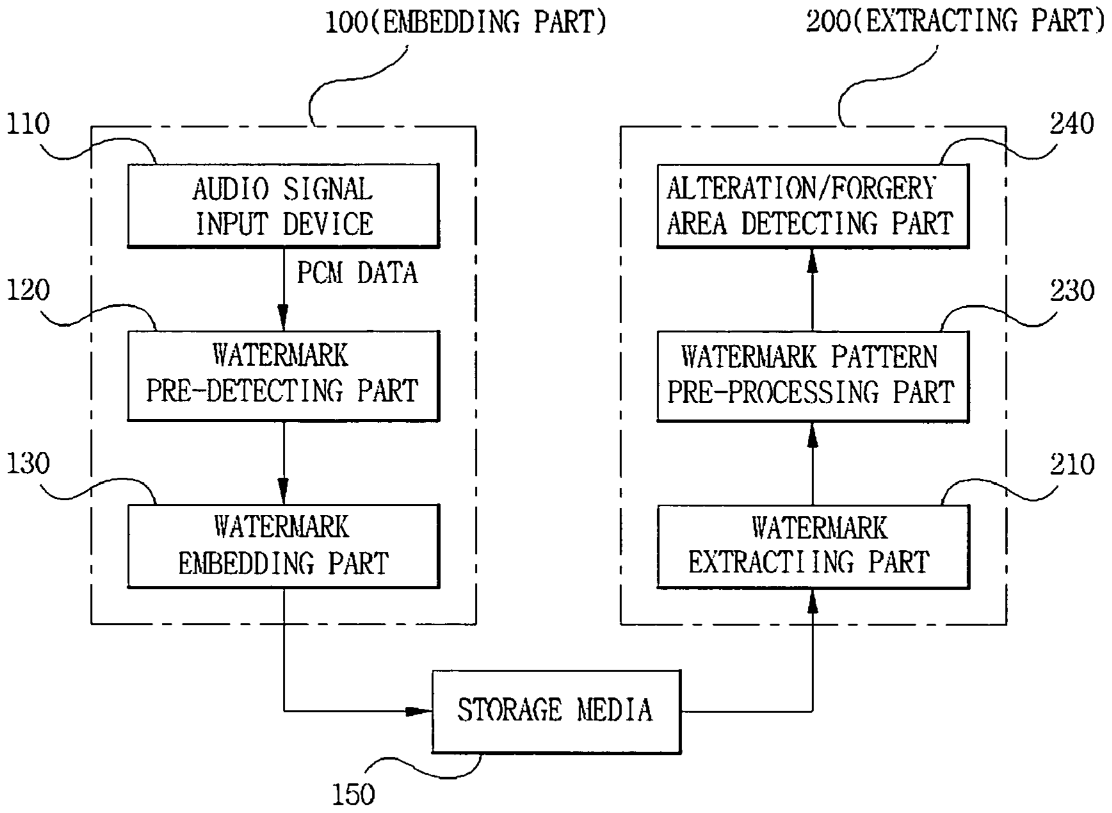
FIG. 1 is a block diagram of the watermarking system performing the method for embedding and detecting watermark in accordance with the present invention.

Referring to FIG. 1, the watermarking device largely comprises an embedding part 100 for embedding a watermark and an extracting part 200 for identifying forgery/alternation.

The embedding part 100 comprises an audio signal input device 110, watermark pre-detecting part 120 and watermark embedding part 130. The digital audio signal (PCM data) outputted by the audio signal input device 110 is inputted into the watermark pre-detecting part 120. The WATERMARK PR-DETECTING PART 120 verifies whether the inputted audio signal is the data wherein a watermark is already embedded. If it is determined in The WATERMARK PR-DETECTING PART 120 that the audio signal is a data wherein a watermark is not embedded, the audio signal is transmitted to the watermark embedding part 130. The watermark embedding part 130 insert the pattern signal as a watermark into the audio signal. The audio signal wherein the watermark is embedded is stored in a storage media 150 of the digital voice recording device.

The extracting part 200 comprises a watermark extracting part 210, watermark pattern pre-processing part 230 and a forgery/alternation area detecting part 240. The watermark extracting part 210 extracts the watermark embedded into the audio signal inputted from the storage media 150 to obtain a pattern signal. The watermark pattern pre-processing part 230 purifies the pattern signal distorted by the incorrect-extraction generated during the watermark extracting process by removing the noise included in the extracted pattern signal. The forgery/alternation area detection part 240 obtains detailed information on the presence of forgery/alternation, location of manipulation, etc. by using the purified pattern signal.

The embedment and extraction of watermark in accordance with the present invention are performed by the above watermarking system. The embedment and extraction of watermark in the present invention will be described in the following.

The semi-fragile watermarking technology is generally used for watermarking which is used for determining the presence of forgery/alternation. This is because watermark is not removed by normal acts for storing data such as transforming file format or compressing files, whereas, watermark is removed by cropping, adding signal, attacks largely affecting the quality of sound, etc., and thus when the original voice signal differs from what it is intended to transmit, it can be determined as forgery/alternation.

For image data, a method comprising steps of segmenting the full image into small blocks, extracting the characteristic value for each block, and storing the characteristic value in a corresponding block using watermarking technology is used. If an image of a part of an area is replaced with another image or removed, no watermark information corresponding to the characteristic value can be detected and thus forgery/alternation can be determined.

Similarly, the present invention is based on the method that audio signals are segmented into a predetermined size of frame and the bit string of pattern information already generated as watermark is inserted into each frame in a regular sequence to identify forgery/alternation generated in audio data.

Figure 2:
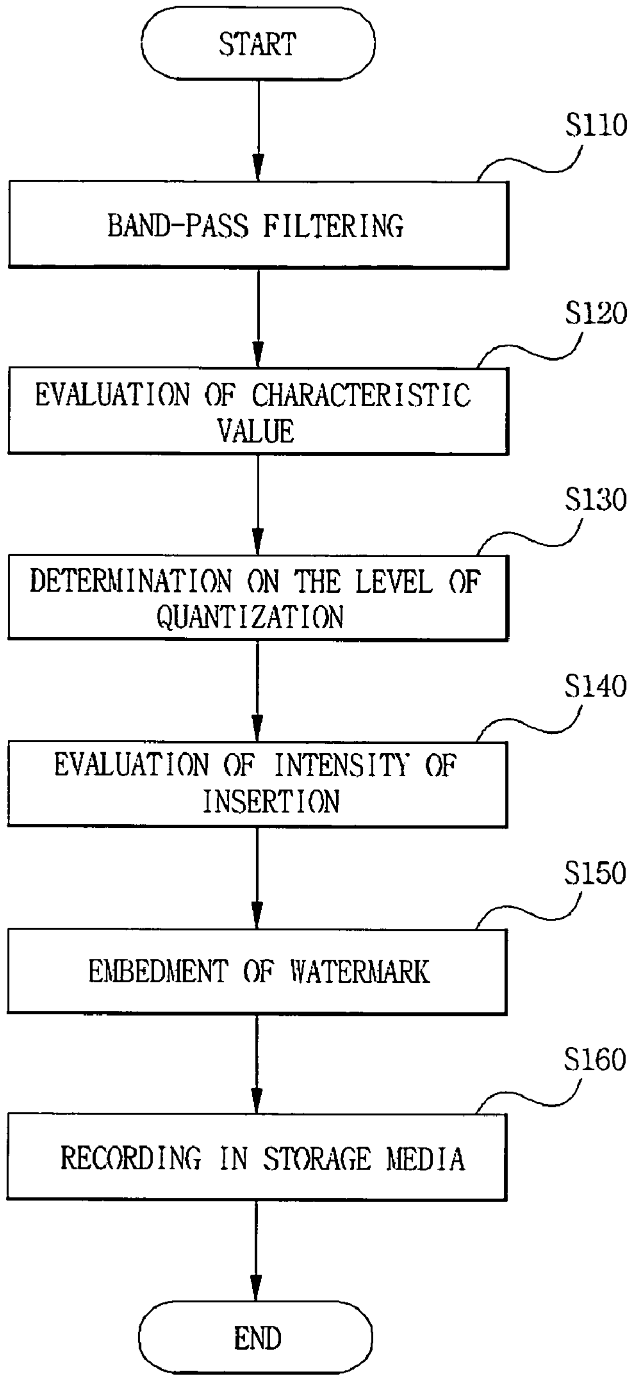
FIG. 2 is a flow chart of the method for embedding watermark in accordance with the present invention.

FIG. 2 is a flow chart of the method for embedding watermark in accordance with the present invention.

The method for embedding watermark in accordance with the present invention comprises the steps of band-pass filtering for audio signal (s110), evaluating a characteristic value of the filtered audio signal (S120), determining the level of quantization for the evaluated characteristic value (S130), evaluating the intensity of insertion corresponding to the determined level of quantization (S140), embedding the watermark using the evaluated intensity of insertion (S150) and recording the audio signal wherein the watermark is inserted into a storage media (S160).

Each step of the procedure of embedding a watermark can be subdivided and described in detail as follows.

<Step 1>: Step S110

Frame Segmenting and Band-Pass Filtering

Figure 3:
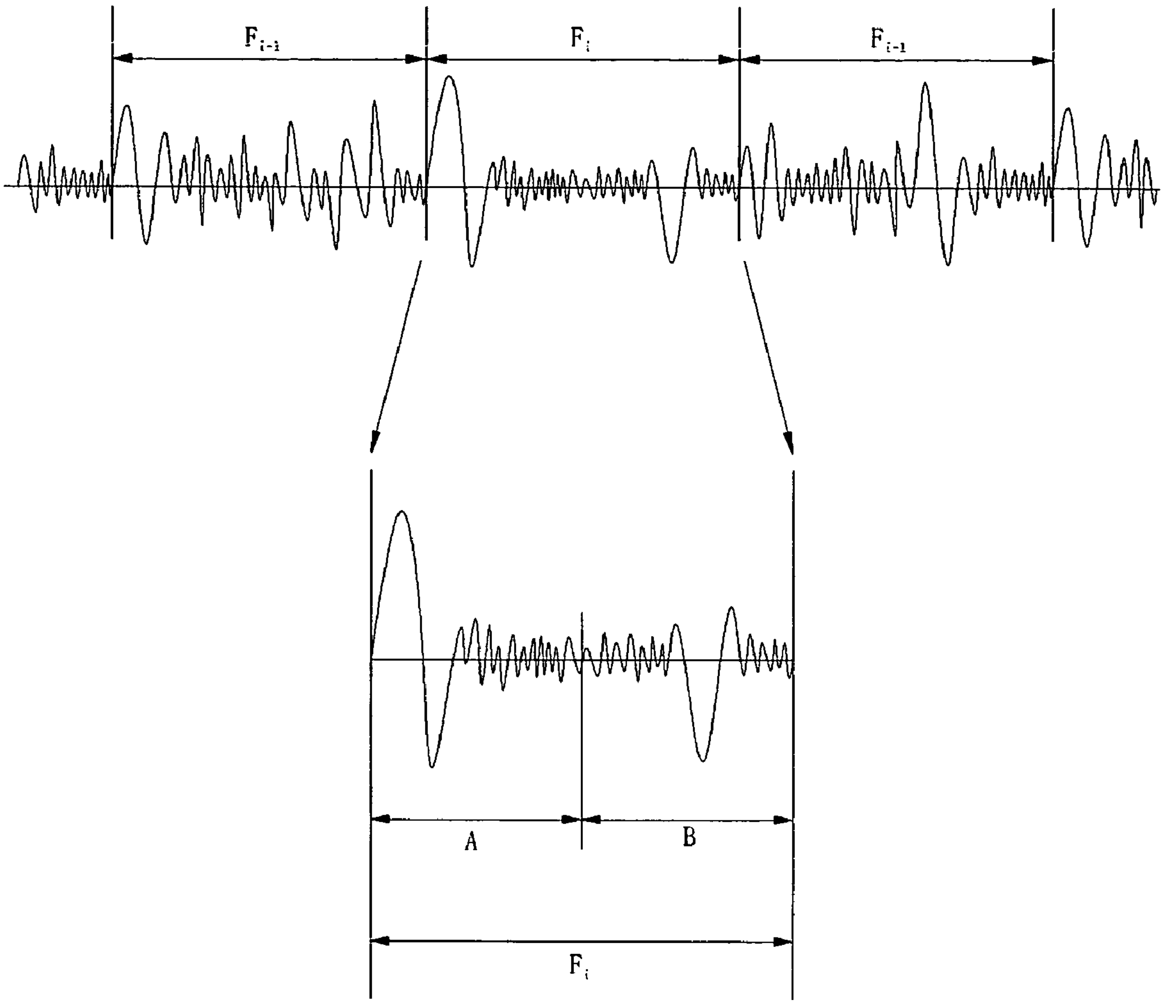
FIG. 3 is a drawing illustrating the frame of the signal to be watermarked.

FIG. 3 is a drawing illustrating the frame of the audio signal. As shown in FIG. 3, the audio signal is segmented into a predetermined length of frame ( . . . , $F_{i-1}$, $F_i$, $F_{i+1}$, . . . ). At this time, the length of each frame should be shorter than 100 ms. Any frame ($F_i$) is segmented into two areas of the same length and each area is named "range A", "range B", respectively.

After segmenting the audio signal into a predetermined size of frame, the corresponding audio signal of the frame ($F_i$) is band-pass filtered. Band-pass filtering is a process for extracting the characteristic value of a reliable audio signal. A band signal between approximately 2 kHz and 4 kHz is used and a band-width of at least 1 kHz is the most appropriate.

The pattern information of the watermark to be embedded is predetermined, and one bit in the pattern information is inserted into one frame ($F_i$) of the segmented audio signal. For example, if the pattern information of the watermark to be embedded comprises {1, 0, 0, 0, . . . 1, 1}, a value corresponding to "1" is inserted into the first frame of the audio signal, and a value corresponding to "0" is inserted into the second frame. After a series of bit string comprising the pattern information is inserted into each frame in a regular sequence as above, a bit string of the same pattern information is inserted repetitively from the next frame.

As above, pattern information comprises bit strings consisting of "1" or "0" whose length are about 20~40, and is repetitively inserted into the audio signal.

<Step 2>: Step S120

Evaluation of the Characteristic Value of the Frame

The characteristic value F of one frame ($F_i$) is evaluated. In order to evaluate a characteristic value F, first the sum total of the square of the audio signals of range A and range B is obtained as follows [Equation 1].

$$S_A = \sum_{t=i-1}^{i-1/2} s^2(t),\ S_B = \sum_{t=i-1/2}^{i} s^2(t) \qquad \text{[Equation 1]}$$

Herein, i-1, i-½ and i respectively mean notations indicating a starting point of range A, an ending point of A (or a starting point of range B), and an ending point of range B. Also, s(t) means the filtered audio signal. The [Equation 1] is a random definition and it can also be defined differently as the following.

Next, the characteristic value F of the audio signal can be obtained as in the following [Equation 2] using $S_A$ and $S_B$.

$$F = \frac{S_A - S_B}{S_A + S_B} \qquad \text{[Equation 2]}$$

The embedment of the watermark in accordance with the present invention is performed by modifying the original audio signal s(t) so that the characteristic value F is changed to a quantized characteristic value F' as follows.

<Step 3>: Step S130

Determination on the Level of Quantization of the Characteristic Value F

In order to embed the pattern information, the quantization standard value into which the characteristic value F of the audio signal should be changed is determined. First, the quantization standard value of set $Q_0$ and $Q_1$ is defined as in the following [Equation 3].

$$Q_0 = [-0.7, -0.3, 0.1, 0.5, 0.9].$$

$$Q_1 = [-0.9, -0.5, -0.1, 0.3, 0.7] \qquad \text{[Equation 3]}$$

If the bit information corresponding to the pattern information (that is, the bit information to be inserted into each frame) is "0", the characteristic value F obtained from [Equation 2] is quantized to the value closest to the value of the elements of set $Q_0$ of [Equation 3]. If the bit information is "1", the characteristic value F is quantized to a value closest to the value of the elements of set $Q_1$.

For example, if the characteristic value F obtained from [Equation 2] is 0.15, the value closest to 0.15 in $Q_0$ is 0.1 and the value closest to 0.15 in $Q_1$ is 0.3. Therefore, if the value of the bit corresponding to the pattern information to be inserted into one frame ($F_i$) is "0", the quantized value Q of the characteristic value F is 0.1, and if the value of the bit corresponding to the pattern information to be inserted into one frame ($F_i$) is "1", the quantized value Q of the characteristic value F is 0.3. The original audio signal s(t) should be modified so that it has a characteristic value which is the same as the quantized value Q determined as above. At this time, the method for modifying the original audio signal goes through the following step 4 comprising steps of obtaining the intensity of insertion g and modifying the original audio signal s(t) according to the intensity of insertion g.

<Step 4>: Step S140

Evaluation of Intensity of Insertion g

In order to quantize the audio characteristic value F, the original audio signal s(t) is modified as in the following [Equation 4].

$$\text{RANGE A: } s'(t)=s(t)+g\cdot s(t)$$

$$\text{RANGE B: } s'(t)=s(t)-g\cdot s(t) \quad \text{[Equation 4]}$$

Herein, s'(t) is an audio signal modified so as to obtain a quantized characteristic value F', g is an intensity of insertion for modifying, added to the original audio signal s(t) in order to modify the original audio signal s(t) so that the audio signal s'(t) after modification has a quantized characteristic value F' as above.

The above [Equation 4] means that when modifying the original audio signal s(t) so that the characteristic value F obtained from [Equation 1] and [Equation 2] has a quantized characteristic value F', in range A within the frame ($F_i$) a signal modifying the original audio signal s(t) as much as the intensity of insertion g is added to the original audio signal s(t), and in range B a signal modifying the original audio signal s(t) as much as the intensity of insertion g is subtracted from the original audio signal.

The intensity of insertion g is obtained by the following mathematical process.

The characteristic value F' of the modified audio signal s'(t) and the determined quantized value Q are identical, and thus they have the following relationship as [Equation 5]

$$F'=Q \quad \text{[Equation 5]}$$

For selecting the intensity of insertion g to satisfy the above [Equation 5], [Equation 1] is inserted into [Equation 2], and s(t) in [Equation 2] is substituted with s'(t) in [Equation 4]. Thus, the following [Equation 6] is obtained.

$$F' = Q = \frac{S'_A - S'_B}{S'_A + S'_B} = \frac{\sum (s_1(t) + gs_1(t))^2 - (s_2(t) - gs_2(t))^2}{\sum (s_1(t) + gs_1(t))^2 + (s_2(t) - gs_2(t))^2} \quad \text{[Equation 6]}$$

Herein, $s_1(t)$ and $s_2(t)$ represent audio signal s(t) in range A and range B, respectively, and $S'_A$ and $S'_B$ are values obtained respectively from [Equation 1] with regard to audio signal s'(t) after modification.

If the term in the far right side of [Equation 6] is developed, the term including $g^2$ may be omitted as the intensity of insertion is sufficiently small, thus the equation can be adjusted to the following [Equation 7]

$$\sum s_1^2(t) - \sum s_2^2(t) + 2g\sum s_1^2 + 2g\sum s_2^2 = Q\left(\sum s_1^2(t) - \sum s_2^2(t) + 2g\sum s_1^2 + 2g\sum s_2^2\right) \quad \text{[Equation 7]}$$

Wherein, if defined as the following [Equation 8], $$F_n=\Sigma s_1^2(t)-\Sigma s_2^2(t),\ F_d=\Sigma s_1^{2+\Sigma} s_2^2 \quad \text{[Equation 8]}$$

$$F = \frac{F_n}{F_d} \quad \text{[Equation 9]}$$

an equation as the above from [Equation 2] is established. Accordingly, [Equation 7] is adjusted as the following [Equation 10], and if value of g from [Equation 10] is obtained, the value of intensity of insertion g is represented as [Equation 11]

$$F_n+2gF_d=QF_d+2gF_nQ \quad \text{[Equation 10]}$$

$$g = \frac{1}{2}\frac{Q-F}{1-QF} \quad \text{[Equation 11]}$$

In this regard, the intensity of insertion g is obtained, i.e., a value for obtaining audio signal s'(t) which is given modification for the original audio signal s(t) so that the characteristic value F of the current audio signal s(t) has a characteristic value F' identical to the quantized value Q.

<Step 5>: Step S150

Embedment of Watermark

When the intensity of insertion g is obtained such as from [Equation 11], [Equation 4] is applied to the original audio signal s(t) and thus the modified audio signal s'(t) is obtained. Such modified audio signal s'(t) has the quantized characteristic value F'.

By obtaining the modified audio signal s'(t), the step for embedding watermark according to the present invention is completed. The audio signal s'(t) obtained thereby is recorded in the storage media (150) (S160). At this time, a separate process for compressing audio data may be carried out before recording.

The signal used for obtaining audio characteristic value F at the step of initiating the above procedure may use part of frequency of the audio signal. That is, without using a full audio signal, only a certain particular band of 1 kHz may be used. Accordingly, if disclosure is not made as to which frequency has been used, it becomes very difficult to identify or search watermark. Also, [Equation 1] used for obtaining audio characteristic value F and [Equation 3] defining the level of quantization can be variously modified, and such modification can be a method for increasing stability of watermarking. Further, by modifying several parameters as such, methods for embedding watermark can be infinitely increased.

For instance, the above equations can be modified as below.

With regard to [Equation 1], it can be substituted with the following [Equation 12].

$$S_A = \sum_{t=i-1}^{i-1/2} |s(t)|,\ S_B = \sum_{t=i-1/2}^{i} |s(t)| \quad \text{[Equation 12]}$$

Values $S_A$ and $S_B$ in the prior step for obtaining characteristic value F in [Equation 1] are obtained by addition of the square of the audio signal in range A and range B, respectively. However, values $S_A$ and $S_B$ in [Equation 12] are obtained by absolute values of the audio signal in range A and range B, respectively.

In this regard, for selecting the intensity of insertion g to satisfy the above [Equation 5], [Equation 12] is inserted into [Equation 2], and s(t) in [Equation 2] is substituted with s'(t) in [Equation 4]. After rearranging the above, a procedure similar to the aforementioned step is carried out and as a result, the intensity of insertion g is obtained such as from the following [Equation 13].

$$g = \frac{Q - F}{1 - QF} \quad \text{[Equation 13]}$$

Moreover, the standard values $O_0$ and $Q_1$ of quantization can be, for instance, modified as the following [Equation 14].

$$Q_0 = [-0.75,\ 0.25]$$

$$Q_1 = [-0.25,\ 0.75] \quad \text{[Equation 14]}$$

Such modification is exemplary, and according to the content or object of the design, various modification can be made. If information with regard to such modification is not exposed, it will be difficult for unapproved hackers from the outside to extract information embedded in the copyright articles. Accordingly, stability of algorithm can be strengthened.

During the process of embedding watermark, silence existing at the beginning part of music is one of the factors that should be taken into consideration. Since silence has a very weak strength of signals and also its extraction is difficult even if information is embedded, silence signals are not used and it is preferable to embed information, starting from the part where the audio signals are generated.

Generally, most of the beginning part of audio has silence from one second to several seconds. Research for identifying such silence has been actively carried out in the field of analyzing audio signals. Herein, generally, histogram, energy function, SVF (spectral variation function), etc. are usually used, and particularly, a technology for identifying silence is also used for analyzing syllables or phonemes of audio signals.

Herein, silence refers to sound inaudible to the ears of the humans. That is, even the noise is treated as sounds having meanings if its sound is very big. The reason for simplifying the steps for identifying silence very much includes first, restriction with regard to the time for identifying silence, second, search for a simple and accurate method for maximizing credibility with regard to identification of silence, and third, rare application of signal segmentation used for audio signals to music.

One of the procedures which should precede for detecting watermark together with the silence identifying procedure is a procedure for synchronization. Herein, for synchronization, it would be enough to enable the position of the frames into which information is embedded to be aligned within the error of 5~10% unlike a spread spectrum method which does not allow any error in one or two sample units.

Accordingly, at the initiation of detection of watermark and during the process of the detection, whether synchronization is consistent should be checked. As errors may occur during the aforementioned silence identifying process, at first, a synchronization must be conformed, and 2 to 3 additional conformation of synchronization should be made during the process of detecting information so as to prevent spread of errors which may occur when the synchronization does not conform.

The signal within 16 bits to 20 bits is embedded as a synchronizing signal in the same manner as that of embedding watermark. If a 16 bit of synchronizing signal is repeatedly detected by moving by 3–5% of the length of the frame in order to detect a synchronizing signal, a graph showing a correlation of the synchronizing signal is obtainable. At this time, the center of the area having the highest correlation is determined as a meeting point of a synchronizing signal. According to the result of detecting the synchronizing signal by moving 3% of the length of the frame, a high correlation having a synchronization error within 15% can be obtained.

In the above embodiment, an example is described wherein a single bit is inserted into each frame of the audio signal. However, a plurality of bits of information may be inserted into one frame. Also, in case that a large amount of information must be inserted in a short audio signal, if several band signals are extracted from the filtering step and bit information is inserted into each band signal, 2 to 3 bits may inserted into a single frame. Of course, in this case, the band must be established so as not to generate interference between filtered signals, and more caution is required than at the time for determining intensity of insertion.

After detecting watermark, together with embedment of pattern information, error detecting code or error correcting code for the pattern information inserted may be inserted in order to increase credibility for verifying alteration/forgery. For instance, if one bit of information is inserted into each frame, 88 bits including 16 bits for CRC are inserted in order to insert 72 bits of information. If 88 bits are encoded in a turbo code, 270 bits are generated, and thus for 72 bits, 270 bits with a size three times bigger are inserted.

In the experiment of the present invention, by using a size of a frame as 80 ms, 270 bit information is inserted into an audio signal which is about 25 seconds long. If the audio can be regenerated for a length of 3 minutes, information is inserted repeatedly by about 7 times.

The reason for inserting CRC (Cyclic Redundancy Code) together with the actual information is to authenticate that the detected information is identical to the inserted information. In this regard, in case that the incorrect information is detected, if it is recognized as a correct value, it may be a fatal weakness to the entire system.

The process for extracting the inserted pattern information is almost similar to the process for inserting.

Figure 4:
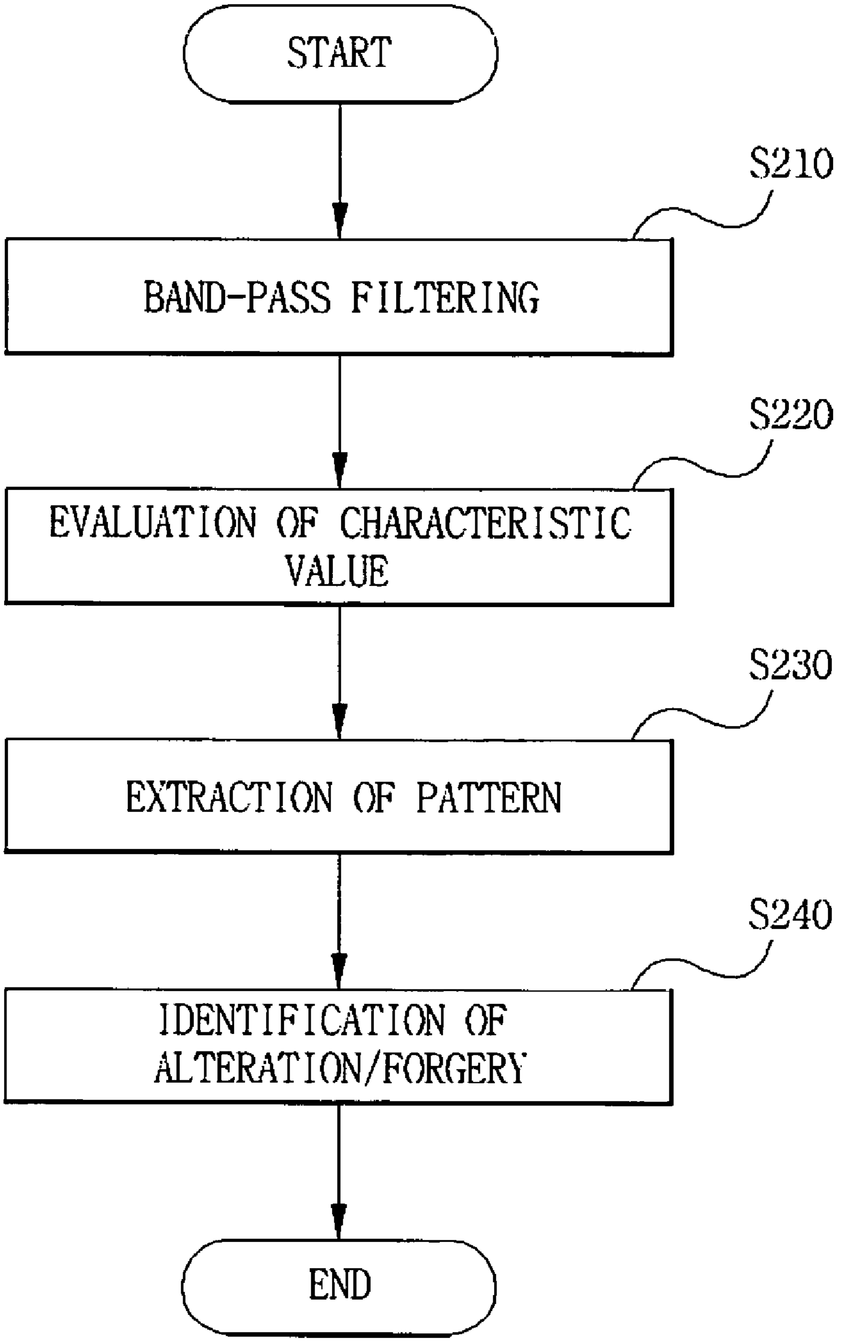
FIG. 4 is a flow chart of the method for detecting watermark in accordance with the present invention.

FIG. 4 illustrates the steps for identifying alteration/forgery according to the process for extracting pattern information.

If it is desired to extract the information inserted into the arbitrary audio signal, similar to the process for embedding, the lengths of silence and noise signals are identified and removed, and filtering is performed out from the part from which the actual sound signal begins with a band filter used in the process for embedding (S210). Such silence identifying process and/or filtering process can be omitted similarly to the time for embedding the watermark. However, if the silence identification and/or filtering is performed when embedding watermark, it is preferable to be also performed when extracting watermark. Further, in order to improve credibility at the time of detecting watermark, the identification of silence should be performed in the same manner as for embedding watermark, and the frequency for filtering should be also as the same as that for embedding watermark.

The next step is to evaluate characteristic value F of the filtered audio signal (S220). The characteristic value F is evaluated in the same manner as for embedding watermark. That is, if the characteristic value F is evaluated according to [Equation 2] at the time of embedding watermark, the characteristic value should be identically evaluated according to [Equation 2] at the time of extracting watermark.

After evaluating the characteristic value F, the characteristic value F is compared with each of the quantized values within the set Q which has quantized values. Herein, the set Q of quantized values should also be the same as that used at the time of embedding watermark.

Figure 5:
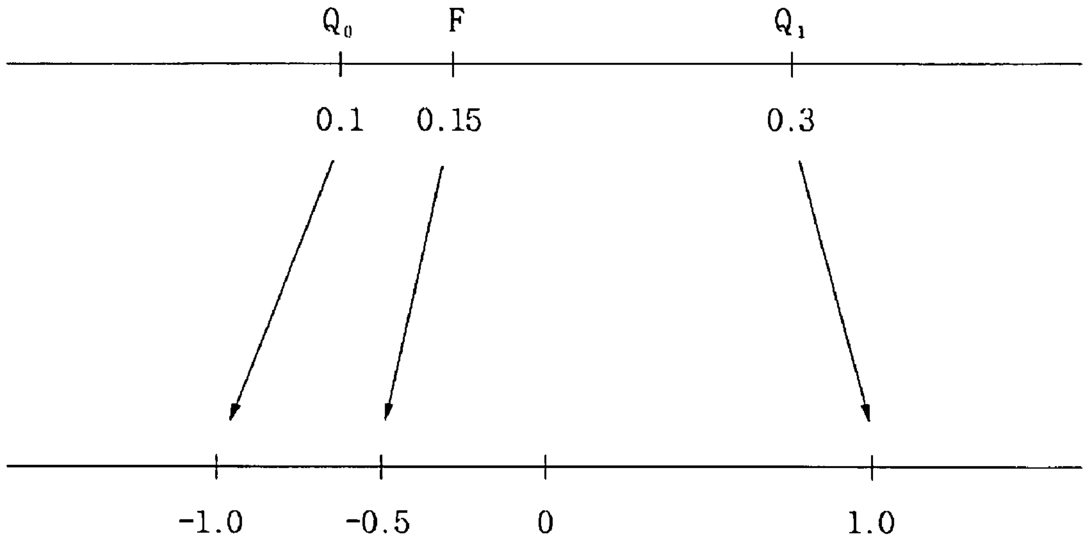
FIG. 5 is a drawing illustrating the mutual relationship between a detected characteristic value and a quantized value.

As a result of comparison, the quantized value closest to the characteristic value F is determined. One of the methods for determining such quantized value is that by determining which element of the set of quantized values a characteristic value is closest to, the degree of the approximation is obtained as a value within −1.0 to 1.0 is obtained. For example, if F is 0.15, F is close to 0.1 which is the element of set $Q_0$ and 0.3 which is the element of set $Q_1$. FIG. 5 illustrates such relation.

As illustrated in FIG. 5, 0.1, the value closest to the characteristic value F in set $Q_0$ and 0.3, the value closest to the characteristic value F in set $Q_1$ correspond to −0.1 and 1.0, respectively. Then, 0.15, the current characteristic value F corresponds to −0.5. Corresponding to −0.5 means that the current characteristic value is closer to $Q_0$ than $Q_1$, which means that the corresponding bit value of the embedded pattern information is "0". That is, in opposite, in order to embed information having a bit value of "0" during the process of embedding watermark to its corresponding bit string, it can be known that processes of quantization, evaluation of intensity of insertion, and modification of audio signal are carried out.

By performing such processes for every frame, a bit string of the pattern information embedded into each frame can be obtained in a sequence. (S230)

As aforementioned, if the embedded pattern information is 72 bits, a total of 270 bits of information into which CRC code and turbo code are added are embedded. Hence, after obtaining 270 bits of information in a sequence as above, through a process for decoding for the turbo code, 72 bits and CRC 16 bits which are embedded information can be obtained.

Finally, decoding for error correcting code and/or error detecting code which are inserted together with the pattern information is performed. If CRC was inserted as an error detecting code at the time of embedding watermark as aforementioned, the extracted watermark information is examined through a CRC check as to whether the extracted information is consistent with the actually embedded information, and thus whether the watermark has been altered/forged is identified. (S240) If, as a result of the CRC examination, the information is consistent, the embedded information is outputted. Otherwise, a word "NONE" is outputted and continuously watermark is detected. In the present invention, once watermark is embedded, all of the watermark information is intended to extract. However, in the actual system, if the watermark is detected, the process for extracting is completed.

If the extracted pattern information is consistent with the embedded pattern information, it can be determined that any modification such as alteration/forgery has not been made to the audio signals. At this time, it is not required for the degree of consistency to be completely consistent, and if a certain critical value, for example, at least 80% of the degree of consistency is exceeded, it is considered consistent. If the degree of consistency is 80% or below, it can be considered that the original audio signals have been altered/forged.

Further, as discussed above in an example of various modification example at the time of embedding watermark, a signal to be watermarked at the time of embedding watermark are filtered through a plurality of ranges of frequency with a respectively different range of band. Also, if each pattern information is embedded for every filtered range of frequency such that a plurality of bits is inserted into a single frame, a task for extracting each bit of pattern information should be also performed at the time of extracting watermark. In order to do so, before evaluating the characteristic value, a signal is filtered respectively through a plurality of ranges of frequency identical to the filtering frequency at the time of embedding watermark, and processes of evaluation of characteristic value (S220), extraction of pattern (S230) and identification of alteration/forgery (S240), etc. should be performed with regard to each filtered signal.

Although the preferable embodiments of the present invention are illustrated and described in the above, the scope of the present invention is not limited to the aforementioned particular embodiments, and a person skilled in the pertinent art can work various modification within the scope that does not deviate from the spirit of the present invention.

What is claimed:

1. A method for embedding watermark, comprising:

(a) evaluating in a predetermined manner a characteristic value for a signal within a frame obtained by segmenting the signal to be watermarked in a predetermined time period;

(b) determining a quantized value most closely approximated to said characteristic value by comparing said characteristic value with said quantized value within a set among a plurality of sets including one or more quantized value respectively, said set corresponding to a value of pattern information embedded into the frame;

(c) evaluating an intensity of insertion used in order to modify the signal within the frame so that the characteristic value is the same as the quantized value determined in the step (b); and d) modifying the signal within said frame based on said intensity of insertion.

2. The method according to claim 1, further comprises filtering the signal through a predetermined range of frequency before said step (a), wherein said characteristic value for said filtered signal is evaluated in said step (a).

3. The method according to claim 1, further comprises detecting a silent part within the signal, wherein said step (a) to (d) are performed for a frame including the signal excepting said silent part.

4. The method according to claim 1, wherein said pattern information includes an error detecting code or an error correcting code.

5. The method according to claim 1, wherein said pattern information includes a synchronizing signal.

6. The method according to claim 1, wherein said pattern information consists of one bit for each frame.

7. The method according to claim 1, wherein said pattern information consists of a plurality of bits for each frame.

8. The method according to claim 7, further comprises filtering the signal through a plurality of ranges of frequency with a respectively different range of a band before said step (a), wherein said plurality of bits is inserted respectively into each of signals filtered through said plurality of ranges of frequency.

9. The method according to claim 1, wherein said characteristic value is evaluated as follows:

$$F = \frac{S_A - S_B}{S_A + S_B}$$

-continued $$S_A=\sum_{t=i-1}^{i-1/2} s^2(t),\ S_B=\sum_{t=i-1/2}^{i} s^2(t)$$

(Herein, s (t) means a signal within a frame to be watermarked, i−1, i−½ and i respectively mean notations indicating a starting point of range A, an ending point of A (or a starting point of range B), and an ending point of range B when a frame is segmented into range A and range B, and F means a characteristic value).

10. The method according to claim 1, wherein said characteristic value is evaluated as follows:

$$F=\frac{S_A-S_B}{S_A+S_B}$$

$$S_A=\sum_{t=i-1}^{i-1/2} |s(t)|,\ S_B=\sum_{t=i-1/2}^{i} |s(t)|$$

(Herein, s (t) means a signal within a frame to be watermarked, i-1, i-½, and i respectively mean notations indicating a starting point of range A, an ending point of A (or a starting point of range B), and an ending point of range B when a frame is segmented into range A and range B, and F means a characteristic value).

11. The method according to claim 1, wherein said step (d) is performed as follows:

RANGE A: $s'(t)=s(t)+g\cdot s(t)$

RANGE B: $s'(t)=s(t)-g\cdot s(t)$ (Herein, range A and range B mean notations indicating each range when a frame is segmented into two ranges, s(t) is the signal within a frame to be watermarked, g is an intensity of insertion, and s'(t) is a signal obtained by modifying the signal s(t) in said step (d) so that said characteristic value is the same as said quantized value).

12. A method for detecting a watermark from a signal into which the watermark is embedded according to the method described in claim 1, comprising:

(e) evaluating a characteristic value for the signal within a frame obtained by segmenting the signal in a predetermined time period in accordance with the same manner in said step (a);

(f) determining a quantized value most closely approximated to said characteristic value by comparing said characteristic value evaluated in said step (e) with each quantized value within a plurality of sets of said quantized values used for a quantization of said characteristic value in embedding said watermark; and (g) extracting a value corresponding to the set of quantized values involving said quantized value determined in said step (f), as a pattern information embedded into said frame.

13. The method according to claim 12, further comprises filtering the signal through a range the same as a range of a frequency for filtering in embedding said watermark before said step (e), wherein said characteristic value for said filtered signal is evaluated in said step (e).

14. The method according to claim 12, further comprises detecting a silent part within the signal, wherein said step (e) to (g) are performed for a frame including the signal excepting said silent signal.

15. The method according to claim 12, further comprises performing operation for an error detecting or an error correcting for a bit string of said pattern information extracted in a sequence from each frame.

16. The method according to claim 12, further comprises detecting a synchronizing signal from said extracted pattern information.

17. The method according to claim 12, wherein said pattern information inserted into said one frame consists of a plurality of bits inserted respectively into a plurality of ranges of frequency with a respectively different range of a band, and said method further comprises filtering the signal through said plurality of ranges of frequency before said step (e), wherein said step (e) to (g) are performed for each filtered signal.

* * * * *